United States Patent [19]

Garis, Jr.

[11] Patent Number: 5,078,628
[45] Date of Patent: Jan. 7, 1992

[54] MARINE PROPULSOR

[75] Inventor: Chester A. Garis, Jr., Gloucester, Va.

[73] Assignee: Newport News Shipbuilding and Dry Dock Company, Newport News, Va.

[21] Appl. No.: 370,686

[22] Filed: Jun. 23, 1989

[51] Int. Cl.$^5$ ............................................. B60L 11/02
[52] U.S. Cl. ........................................ 440/6; 114/338; 114/20.2; 310/87
[58] Field of Search ............. 114/337, 338, 342, 20 A; 440/5, 6, 67, 60; 310/87, 89, 90, 63, 126, 178, 206, 268, 61, 60 R, 184, 198, 68 D, 156, 90, 160; 417/355, 356, 423.7, 423.3, 423.15, 423.12, 423.13, 423.14; 384/97, 900, 606

[56] References Cited

U.S. PATENT DOCUMENTS

| | | | |
|---|---|---|---|
| 3,101,066 | 8/1963 | Haselton | 114/337 |
| 3,112,610 | 12/1963 | Jerger | 440/67 |
| 3,182,623 | 5/1965 | Lehmann | 114/337 |
| 3,914,629 | 10/1975 | Gardiner | 440/6 |
| 4,050,849 | 9/1977 | Sheets | 440/5 |
| 4,360,348 | 11/1982 | DeMarco | 440/67 |
| 4,389,198 | 6/1983 | Henderson | 440/60 |
| 4,691,133 | 9/1987 | Mongeau | 310/178 |
| 4,789,302 | 12/1988 | Gruzling | 440/67 |
| 4,831,297 | 5/1989 | Taylor et al. | 310/87 |

FOREIGN PATENT DOCUMENTS 1439806 6/1976 United Kingdom .................. 310/87

Primary Examiner—Ed Swinehart
Attorney, Agent, or Firm—Lalos & Keegan

[57] ABSTRACT

A marine propulsor for submersible vessels or surface vessels powered by underwater propulsion units. A shaftless motor with disk-shaped rotor and stator(s) is mounted in the vessel structure with a blade hub mounted on the rotor, the hub including propeller blades extending beyond the circumference of the vessel housing. The motor is substantially iron-free with much of the rotor/stator volume being occupied by windings, thus providing sufficient power without taking up substantial space or adding burdensome weight. The rotor is journal mounted in the vessel and circumferential thrust bearing assemblies are provided around the rotor/blade hub assembly. A water cooling/lubricating system is provided for the bearings and rotor/stator(s). Power is supplied individually to two stators mounted on either side of the rotor to control electromagnetic forces on the rotor to offset thrust forces and to reduce the magnitude of propulsor induced structural vibration. Rotor excitation current may be inductively supplied, or permanent magnets or low reluctance magnetic material may be mounted in the rotor. Sound insulation is interposed between stators and the vessel structure to dampen ac noise/vibrations. In a dual counter-rotating propulsor embodiment, a thrust transference member is interposed between propulsor assemblies.

128 Claims, 9 Drawing Sheets

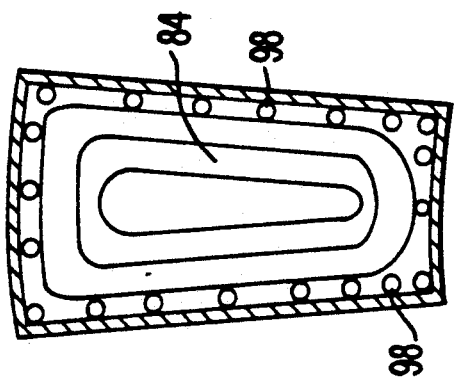
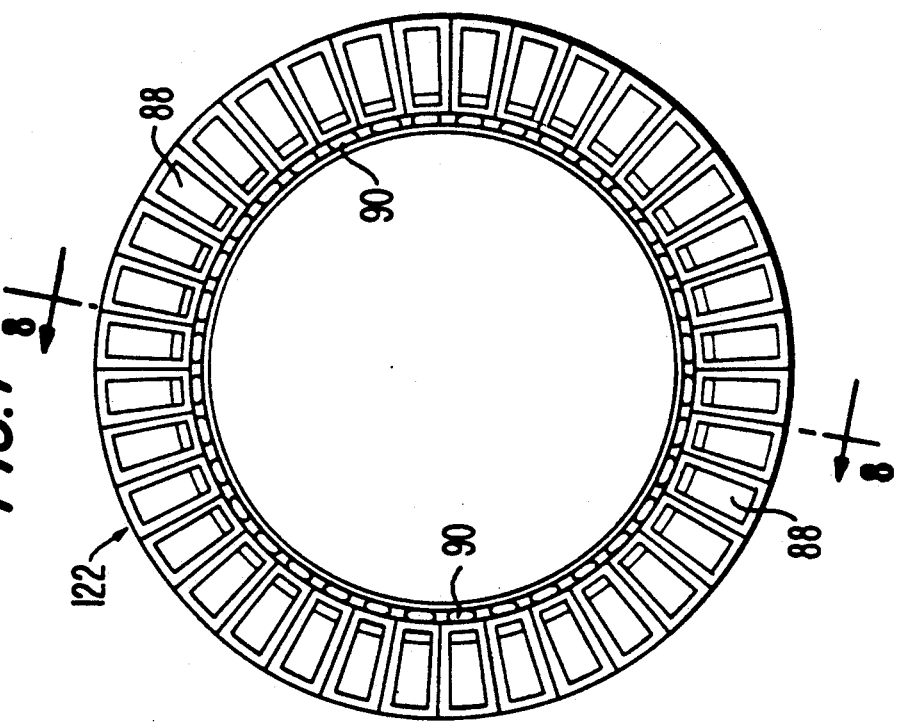
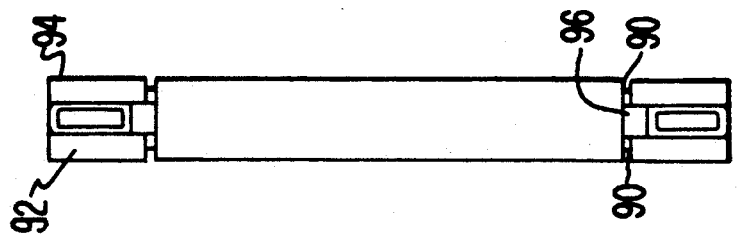

MARINE PROPULSOR

FIELD OF INVENTION

This invention relates generally to propulsion systems and more particularly to propulsors for submersible or semisubmersible vessels or surface ships.

BACKGROUND OF THE INVENTION

Various systems have been proposed for water-going vessels in which one or more rotating propellers are disposed beneath the water line of the vessel for semi-submersible vessels or disposed within a portion of the hull of submersible vessels.

Typically, the propellers in submersible systems have been driven by diesel power, steam turbines or electric motors mounted within the hull of a vessel. A propeller shaft extends through the hull to the propeller mounted on the shaft outside the hull. Such systems have the disadvantages of shaft vibration and noise radiating from the shaft. Further, leaking around the shaft occurs when the seal becomes loose or worn. Alternative systems have been suggested using shaftless electric motors mounted outside of the hull with only electric power cables passing through the hull. U.S. Pat. No. 3,182,623 provides one such example of shaftless motors used to drive impellers mounted within the tail section of a submarine. A disadvantage of such system is that propulsors (electric motors and impellers) occupy almost the entire interior of the tail section. Further, traditional shaftless electric motors are either too small to effectively move a vessel or, if large enough, add significant weight to the vessel. U.S. Pat. No. 3,101,066 suggests another shaftless electric motor for propelling a submersible vessel. Again, however, the traditional motor disclosed in the U.S. Pat. No. 3,101,066 has insufficient power to drive the vessel in which it is mounted and, if the size of the conventional motor with cylindrical iron rotor and stator is increased, the size and weight of the motor become a major disadvantage.

These prior systems have failed to address the additional problems of handling the thrust imparted by the propellers in large vessels, or the problem of handling cooling and lubrication of bearings associated with a shaftless motor mounted in a submersible vessel. Further, prior systems have failed to adequately address the problems of cooling/lubricating bearings in contaminated or muddy waters. In addition, prior systems have not solved the problem of electrical noise imparted to the vessel hull by the stator of an electric motor mounted to the hull or mechanical vibration imparted by the rotor. These and other disadvantages of the prior art systems are overcome by the unique features of the propulsion system of the present invention.

SUMMARY OF THE INVENTION

It is an object of the present invention to provide an improved propulsor for submersible vessels, or surface vessels or semi-submersible vessels with underwater propulsion arrangements.

It is another object of the invention to provide a propulsor with a shaft-free motor of sufficient power to drive a marine vessel but with a motor of minimum weight and size.

A further object of the invention is to provide an improved mounting arrangement for the motor rotor including a journal bearing and a fluid supply for cooling/lubricating the journal bearing.

Another object of the invention is to provide an arrangement for handling and distributing thrust imparted by the propulsor including circumferential thrust bearings, and a fluid supply for cooling/lubricating the thrust bearing(s).

It is another object of the invention to control power to the propulsor so that a certain amount of propulsor thrust can be countered with electromagnetic forces and the position of the rotor can also be controlled by varying electromagnetic forces to dampen propulsor induced structural vibrations.

It is yet a further object of the invention to provide a shaft-free submersible motor in which rotor excitation current is inductively supplied.

It is another object of the invention to provide a marine propulsor with sound insulation between the vessel hull and the propulsor.

A further object of the invention is to provide a thrust transmitting arrangement in a dual rotor, counter-rotating marine propulsor.

Another object of the invention is to provide an improved marine propulsor with a shroud extending around the propulsor blades.

Yet a further object of the invention is to provide a marine propulsor that is modular to facilitate assembly and removal.

The marine propulsor of the present invention includes one motor in a first embodiment or two motors with counter-rotating propellers in a second embodiment. The motors include a disk-shaped rotor and two disk-shaped stators mounted in the body of vessel and being axially aligned with a longitudinal axis of the vessel. If the vessel is not itself completely submersible, the motors can be mounted in pods or cylindrically shaped casings attached below the bottom surface of the vessel. Unlike many conventional marine motors, the motor of the present invention is shaft-free. The stators are mounted in fixed positions to the vessel or propulsion pod housing and the rotor is journal mounted to the vessel or pod housing. Hereinafter, although reference may be made only to a vessel, it is to be understood that the invention is equally applicable to submersible vessels and to pods or propulsor housings mounted below a surface vessel. Electrical power is supplied to the stator windings through waterproof cables and connectors.

The propulsor blades are mounted on a hub assembly that is removably attached to the rotor. A shroud, which can be mounted to the hub assembly or the vessel housing covers the propulsor blades. In the dual counter-rotating embodiment, a single shroud can cover both blade assemblies or individual shrouds can be provided for each.

In contrast to the traditional heavy, bulky electric motors used in marine propulsors, the rotor and stators utilized in the present invention are substantially iron free. Much of the volume of the motor is occupied by electrical conductors. As a result, the disk-shaped motor is more compact and lighter than traditional motors and yet power is not sacrificed because the space utilized for conductors is greatly increased.

The thrust created by the propeller blades, attached to the rotor by the blade hub assembly, is transferred to the vessel through a circumferential thrust bearing. The thrust bearing can be a single annular bearing or a plurality of spaced bearing assemblies mounted to the vessel structure around the circumference of the vessel and positioned to cooperate with a bearing surface on the rotor or propeller hub. The rotor is journal mounted on a vessel inner housing. A journal bearing mounted on a circumferential surface of the inner housing cooperates with a circumferential bearing surface of the rotor.

The propulsor assembly with rotor, stators, thrust and journal bearings are outside the vessel housing (which may be a pressure hull in a submergent vessel) and are exposed to water. The rotor, stator and bearings are water cooled and water lubricated. To ensure a supply of clean water to these elements when operating in contaminated waters, a forced seawater supply is provided. This water supply may be either filtered water or clean water from an internal tank. This forced clean water is pumped to the journal bearings and then drawn by centrifugal force up through fluid channels in the rotor toward the thrust bearings located near the periphery of the rotor. Additionally, water can be pumped through channels in the stator for cooling.

Electrical power is generated by traditional means, including fossil fuel systems or nuclear generators. The electrical power is delivered to the two stators through a variable frequency converter or controller, for example a cycloconverter. Thus, the speed of the motor can be controlled by varying the frequency of input power. The magnitude of propulsive thrust produced by the rotating propeller blades through the water will be proportional to magnitude of power delivered to the motor. The motor speed can be brought up slowly from zero cycles/second to synchronize the speed of the rotor with the speed of the rotating magnetic field of the stator, thus preventing any slip and producing maximum propulsive thrust from the input power.

The two stators are mounted on opposite sides of the rotor. Each stator may be provided with an excitation winding (primary) and the rotor may be provided with a secondary excitation winding and rectifiers to provide the rotor excitation current. Alternately, a rotor magnetic field may be provided by permanent magnets mounted in the rotor. The rotor magnetic field reacts with a rotating magnetic field of the stator to produce rotational torque upon the rotor. Power is supplied separately to each stator from the variable frequency controller so that the magnitude of power supplied to one stator can be different than the magnitude of power supplied to the other stator. In addition to the rotational force applied to the rotor caused by the rotating magnetic field in the stators, the stators, placed on opposite sides of the rotor, will exert lateral force on the rotor due to the stator's magnetic field. If equal power is supplied to both stators, the attractive force on the rotor will be balanced between the two. However, if one stator is overenergized and the other stator is underenergized, the balance of attractive force can be shifted to the overenergized stator. This capability can be used to absorb some of the thrust forces applied against the thrust bearings. By shifting the balance of attractive magnetic forces on the rotor, its position while rotating between stators can be controlled to a certain degree to reduce the magnitude of rotor vibration that would normally be transmitted to the neighboring vessel structure.

The major components of the propulsion assembly including rotor, stators, propeller blade hub, and shroud can be individually installed or removed from the vessel. Further, each of these components may be of split construction.

This modular assembly greatly facilitates initial construction and later maintenance. The stators can be bolted to an aft member of a vessel hull section and the rotor journal mounted on an inner hull section. The propeller blade hub assembly is removably attached to the rotor and the propeller shroud can be removably attached to the blade hub or to the vessel hull. The second stator can then be mounted to a forward member of the vessel hull to complete the modular assembly of the major propulsor components. Interposed between the stators and the vessel hull sections to which they are attached will be a sound insulation layer, e.g. rubber, to absorb or reflect alternating current vibrations produced by the stator windings.

In one embodiment of the present invention, dual, counter-rotating propulsors are used with a thrust transference member interposed between the two propulsors. In this arrangement, two rotors (one with reverse blades) are journal mounted in the vessel structure on either side of the thrust transference member. Stators (four total) are mounted on either side of each rotor and are powered such that the rotors rotate in opposite directions. Thrust bearing assemblies are mounted on either side of the transference member and on the fore and aft sections of the vessel hull. In this arrangement, during forward movement, propulsion force of the forward rotor/blade assembly is transferred directly to the vessel structure through the forward thrust bearings and propulsion force of the rearward rotor/blade assembly is transferred through the thrust transference member, its thrust bearings and the forward thrust bearings to the vessel structure. During rearward movement, the opposite sequence of propulsion force transference occurs.

These and other features, objects and advantages of the present invention will be apparent from the foregoing drawings and detailed description.

BRIEF DESCRIPTION OF THE DRAWINGS

FIG. 7 is a diagrammatic view of the rotor frame showing the winding mounting slots.

FIG. 8 is a side view along the line 8—8 of FIG. 7.

FIG. 9 is a diagram of a typical rotor winding mounted in a slot.

DETAILED DESCRIPTION

Figure 1:
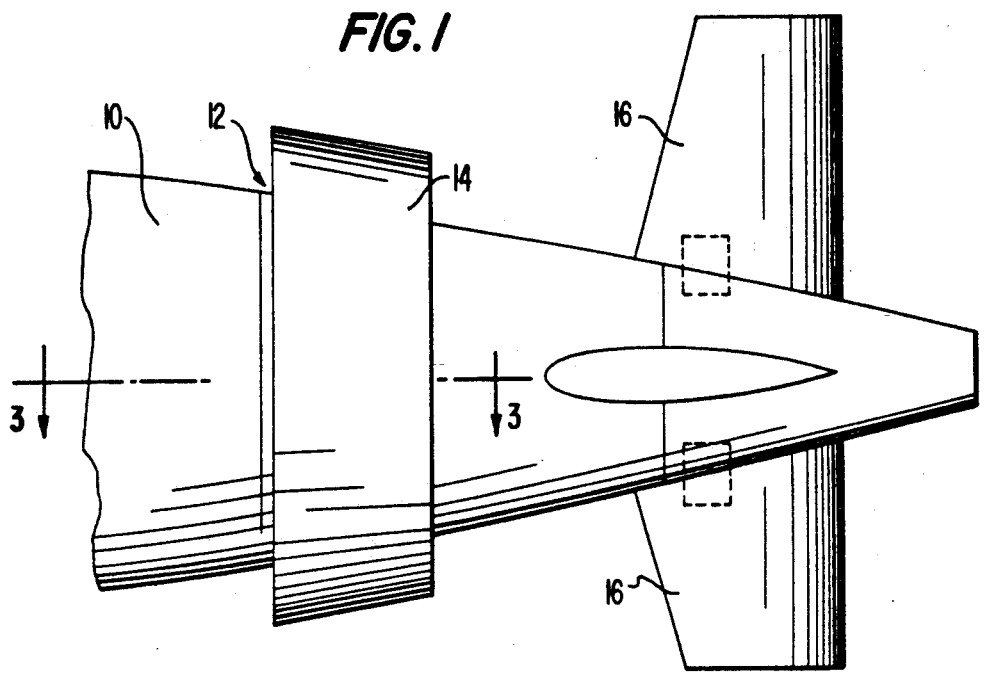
FIG. 1 is a fragmentary side elevational view of the aft section of a submersible vehicle or pod or submersible propulsor housing.

FIG. 1 illustrates a fragmentary view of the marine vehicle in which the present invention would be incorporated. This vehicle could be a submersible vessel, as shown for example in U.S. Pat. No. 3,101,066, in which instance body 10 may be a pressure hull. Alternately, the vehicle could be a surface vessel, in which instance the propulsor of the present invention may be mounted in a pod or cylindrical or cigar-shaped propulsor housing attached below the bottom surface of the vessel and below water, as shown for example in U.S. Pat. No. 4,389,197. In either situation, the marine propulsor of the present invention will be installed in a section 12 of body 10, having generally a cylinder or frustum shape or configuration. Also shown in FIG. 1 is a shroud 14 covering the blades of the propulsor assembly. Fins 16 may be mounted at the end of a submersible vessel or on an attached pod or propulsor housing.

Figure 2:
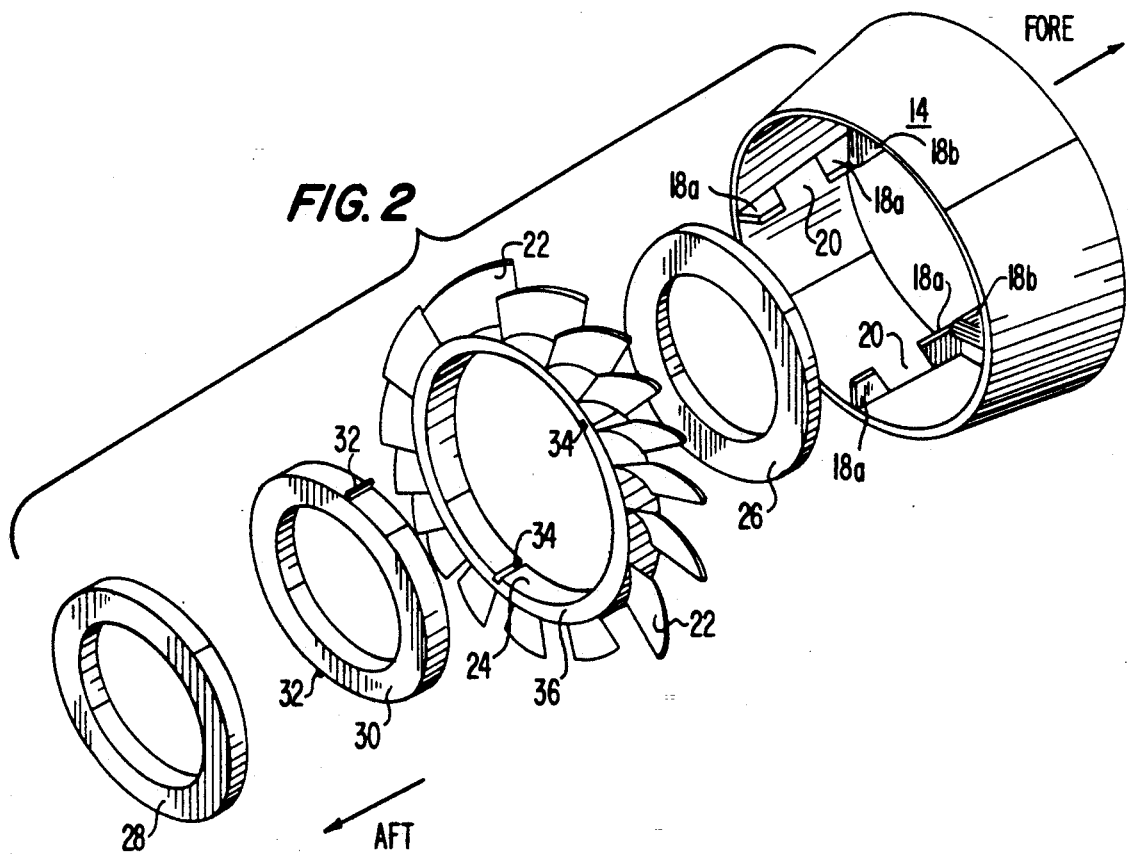
FIG. 2 is an exploded perspective view of the major components (details omitted) of the propulsor assembly.
Figure 3:
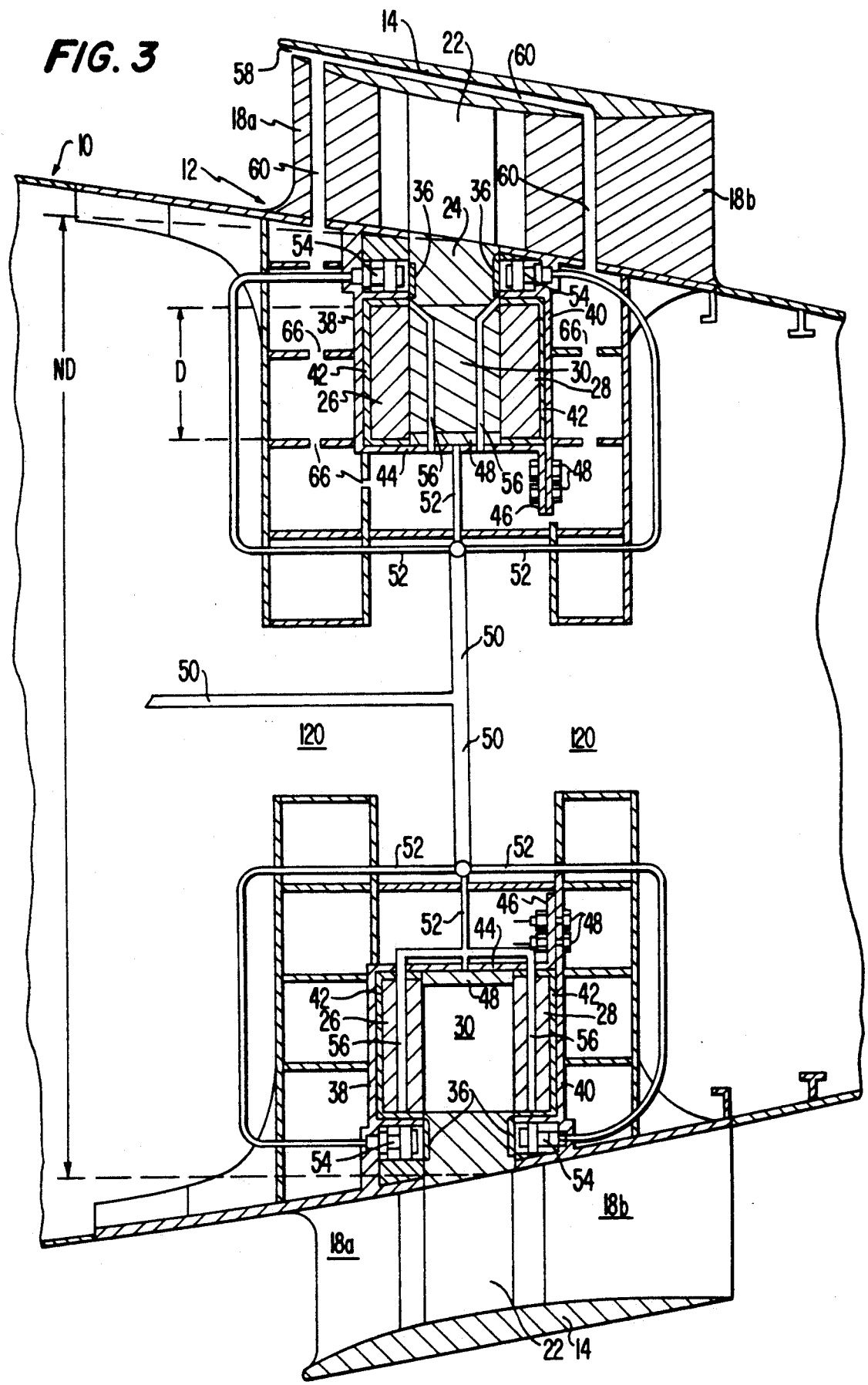
FIG. 3 is a side cross-sectional view along the line 3—3 of FIG. 1.

As best shown in FIG. 2, the propulsor assembly is of modular construction, facilitating installation and removal. FIG. 2 illustrates the general relationship of the major components of the assembly, with details omitted. Shroud 14 is shown with four rib supports 18 that include openings 20 to accommodate rotating blades 22. Openings 20 divide each rib support 18 into preswirl struts 18a and postswirl struts 18b (FIGS. 2 and 3.). Shroud 14 may of course be much larger than shown in relation to the blades 22 and blade hub 24. In installing the propulsor assembly, forward stator 26 may be mounted to a forward section of vessel housing 10 and rearward stator 28 may be mounted to a rearward section of vessel housing 10. Rotor 30 is journal mounted to an inner housing section. Blade hub 24 is fit over rotor 30 with rotor keys 32 being received within hub key slots 34 thus fixing hub 24 relative to rotor 30. As rotor 30 rotates, hub 24 and blades 22 are rotated through the water causing a propulsion force that is transmitted to the vessel through thrust bearings in contact with thrust bearing surface 36. Bearing surface 36 may be on rotor 30 rather than hub 24 as shown. Each of the stators 26 and 28, rotor 30, blade hub 24, and shroud 14 may be of split construction to further ease installation and removal.

FIG. 3 is a cross sectional view of the vessel body section 12 with propulsor assembly installed. The forward stator 26 and rearward stator 28 are mounted to front body portion 38 and rear body portion 40 of the vessel. Interposed between stators 26,28 and body sections 38 and 40 is sound attenuating material shown generally as 42. This material 42 may be any suitable acoustic insulation, e.g. rubber, wood, or fiberglass. This material will absorb or deflect alternating current (ac) waves generated by the stator windings and will dampen ac vibrations of the vessel body. This insulation prevents the body of the vessel from amplifying and transferring noise from the motor to the water surrounding the vessel.

The stators 26 and 28 and rotor 30 are disk shaped, as best shown in FIG. 2, without a drive shaft or other mechanism occupying their center. As a result, the central section 44 of the vessel body 10, which is a substantially cylindrical housing, can be open as shown generally at 120 in FIG. 3. Central housing 44 can provide space for assemblies connecting the fore and aft of the vessel, thus permitting the aft of the vessel to be used, for example, for launching smaller vehicles or torpedoes (e.g. where the vessel is a submarine). The rear body section 40 of the vessel can be detachably connected to front section 38 by a bolting flange 46 extending from central housing 44. Rear section 40 can be connected to flange 46 by bolts 48, or other suitable means.

Figure 4:
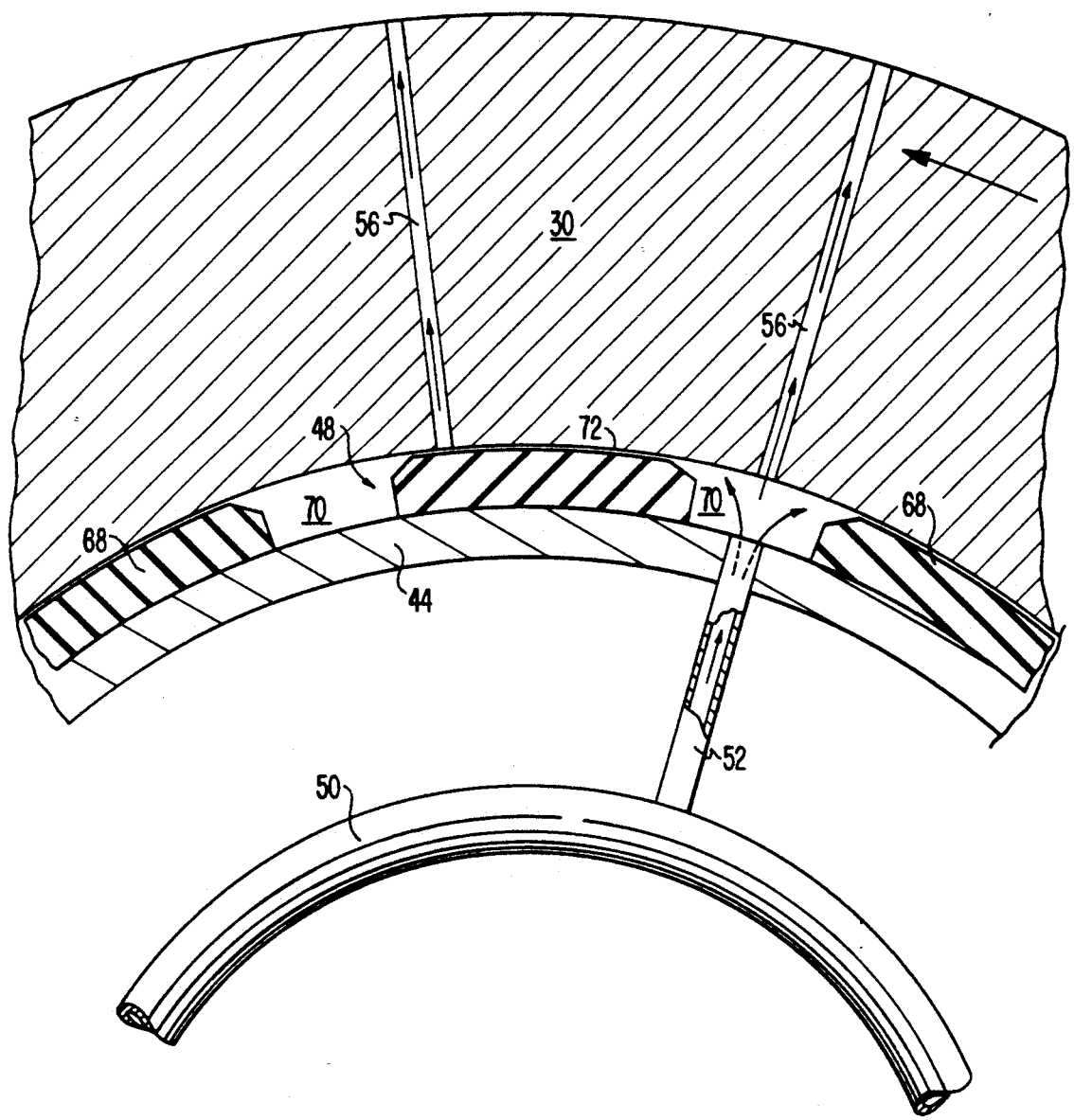
FIG. 4 is a diagrammatic view showing the general relationship of rotor fluid passages and the journal bearing on which the rotor is carried.

The rotor 30 is journal mounted on central housing 44. A journal bearing, shown generally at 48, carries the rotor 30. The journal bearing 48, described in greater detail in connection with FIG. 4, is water cooled and lubricated. Forced seawater is supplied from either a clean water tank (not shown) or through a filtered seawater inlet (not shown) through main fluid conduits 50 and secondary fluid conduits 52 which lead to journal bearing 48 and also to thrust bearing assemblies 54. The thrust bearing assemblies 54 are mounted on a peripheral area of the front and rear body sections 38 and 40 around their circumference to transfer (through bearing surface 36 of blade hub 24) the propulsive force created by the rotating blades 22 of the assembly to the vessel body 10. Bearing surface 36 may also be on rotor 30. The thrust bearing assemblies may comprise solid annular bearings or a plurality of spaced thrust bearing assemblies (e.g. conventional tilting pad type) mounted on the circumference of each of the front and rear body sections. The water forced through conduits 52 cools and lubricates thrust bearing assemblies 54.

The rotor 30 and stators 26 and 28 are located outside of body 10 and are cooled by the surrounding water. They operate in water and at submergent water pressure, thus requiring no complex seals between the motor and the body of the vessel. In muddy or contaminated waters, clean or filtered water can be passed through the rotor and stators through tertiary passages 56. For the sake of simplicity, tertiary passages 56 are shown passing through rotor 30 only in the upper half of FIG. 3 while passages 56 are shown passing through stators 26 and 28 only in the lower half of FIG. 3. Cooling water can be pumped through the rotor and/or stators through fluid conduits 52. Alternatively, cooling water can be brought in through a filtered inlet 58 in shroud 14. Again, for simplicity in the drawing, this alternative is shown only in the upper half of FIG. 3. Inlet 58 feeds a cooling water passage 60 that extends through shroud 14, pre-swirl strut 18a and post swirl strut 18b. Struts 18a and 18b can be movably mounted to shroud 14 and/or body 10 to improve backing capabilities and maneuverability. Cooling passage 60 extends through limbers or passages 66 that supply water to tertiary passages 56.

FIG. 4 illustrates the relationship of tertiary passages 56 in the rotor 30 to the journal bearing. Filtered seawater or a fluid is pumped (by a conventional pump, not shown) through main fluid conduit 50 and secondary conduit 52 until it reaches the journal bearing 48. Alternatively, seawater may be directed through shroud 14 and limbers or passages 66 to journal bearing 48, as best shown in FIG. 3. Journal bearing 48 may take many forms, such as a plain cylindrical bearing, or as shown in FIG. 4 may include a plurality of spaced rubber staves or plates 68 mounted on an outer circumferential surface of vessel central housing 44. Water passes out of conduit 52 into the interstices 70 between staves 68. As rotor 30 turns, water is drawn between staves 68 and rotor bearing surface 72 to lubricate and cool journal bearing 48. Also, due to centrifugal force, water is drawn up through passages 56 in rotor 30 to cool the rotor and also to supply a cooling and lubricating fluid to thrust bearing assemblies 54. As best seen in FIG. 3, the outlets of passages 56 are in the vicinity of thrust bearing assemblies 54 and bearing surface 5 of blade hub 24.

Figure 5:
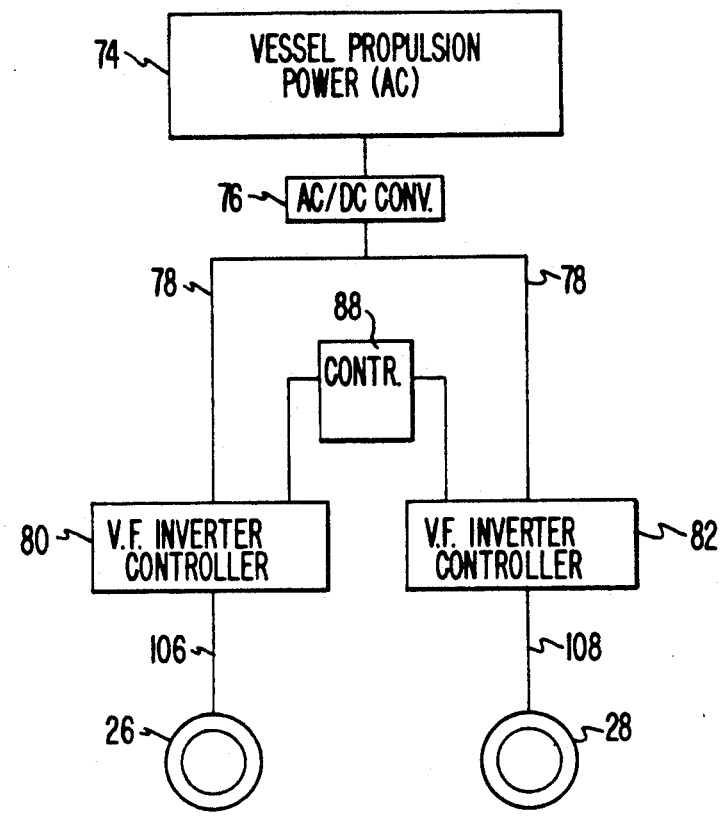
FIG. 5 is a general block diagram of the electrical supply system.
Figure 5A:
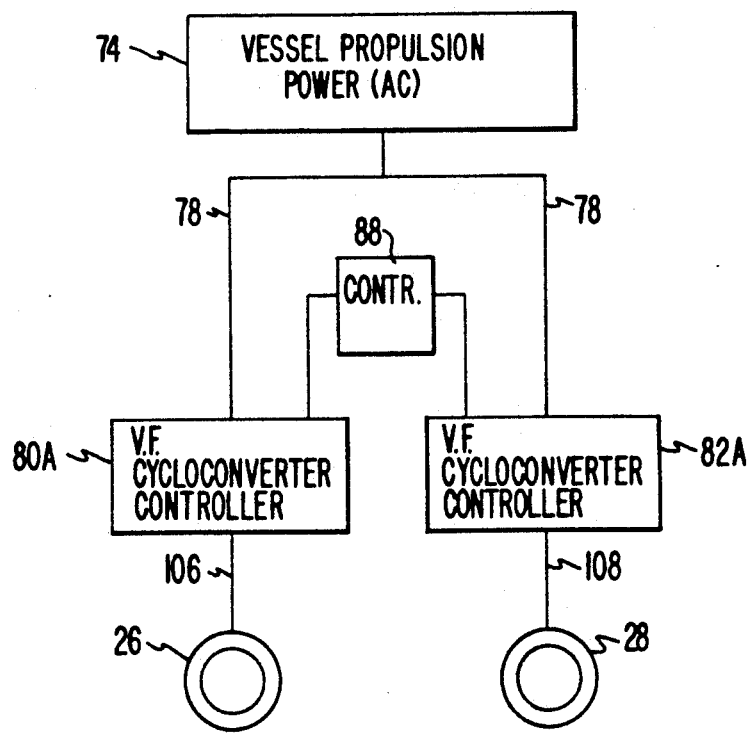
FIG. 5A shows an alternate embodiment of the electrical supply system shown in FIG. 5.

FIG. 5 illustrates in general block form the electrical power system. The vessel propulsion power 74 may be any conventional power generator, e.g. fossil fuel, nuclear, etc. Optionally, the system may include an ac-to-dc converter system 76 to provide dc power on dc bus 78 to variable frequency (v.f.) inverter controllers 80 and 82. The v.f. inverter controllers invert power supplied on the dc bus 78 to ac power at a desired frequency. Two v.f. inverter controllers are provided to individually supply power to stators 26 and 28. Alternatively, as shown in FIG. 5A, ac-to-dc converter system 76 may be eliminated by utilizing v.f. cycloconverters 80A and 82A that directly convert the vessel propulsion ac power to the desired frequency. Power is supplied to the stator windings through waterproof cables and connectors, shown generally as 106 and 108. A conventional controller 88 (e.g. programmable computer) is utilized to operate v.f. controllers 80 and 82 to vary allocation of power between stators 26 and 28. The speed of rotor 30 will be proportional to the frequency of power supplied to stators 26 and 28. An advantage of the v.f. controller is that the motor speed can be increased slowly from zero cycles/second to a desired operating speed while maintaining synchronization between the rotor speed and the speed of the rotating magnetic field of the stator, thus preventing slip and maximizing torque.

Utilization of separate power inputs for the two stators 26 and 28 provides a unique advantage in controlling the electromagnetic forces on the rotor 30. Stators 26 and 28 are mounted on opposite sides of the rotor as illustrated in FIGS. 2 and 3. Alternating current in the stator windings will set up a rotating magnetic field that will react with a rotor magnetic field to produce torque and a resultant propulsive force via blades 22. In addition, the stator magnetic fields will exert lateral force on the rotor. If controller 88 is operated to cause v.f. controllers 80 and 82 to supply equal magnitudes of power to stators 26 and 28, the attractive forces on the rotor will be balanced between the two stators. However, controller 88 can be operated to cause v.f. controllers 80 and 82 to overenergize one stator and underenergize the other, thereby shifting the balance of attractive forces to the overenergized stator. This capability can be used to electromagnetically counter the thrust forces by increasing the balance of attractive magnetic forces in a lateral direction opposite to the direction of thrust. This can relieve the forces applied against thrust bearings 54 and eliminate contact of the bearing surfaces. As a result, transmission of vibration forces of the rotor assembly to the supporting structure is minimized. The electromagnetic imbalance effectively absorbs propulsive thrust forces on the rotor assembly and reduces propulsor induced structural vibration.

As mentioned previously, the motor of the present invention is shaftless, has a disk-shaped rotor and stators, and is substantially iron-free. Iron-free, disk-shaped machines are disclosed generally in U.S. Pat. No. 4,691,133. In contrast to conventional iron motors generally used in marine vessels, the rotor/stator windings of the motor of the present invention contribute a larger proportion of the weight of the rotor and stators. Utilizing the space of the rotor/stator for windings provides sufficient power to drive the vessel without increasing the size or weight of the motor as would be required in a conventional iron motor. Referring to FIG. 3, the radial dimension D of the rotor 30 and stators 26 and 28 is at least 10% of the nominal diameter ND of the vessel body section 12 at the point where the propulsor assembly is mounted. This radial dimension provides sufficient space for a large number of windings to be mounted in the rotor and stators, yet leaves the inner portion of the vessel open for utilization of the aft section.

Figure 6:
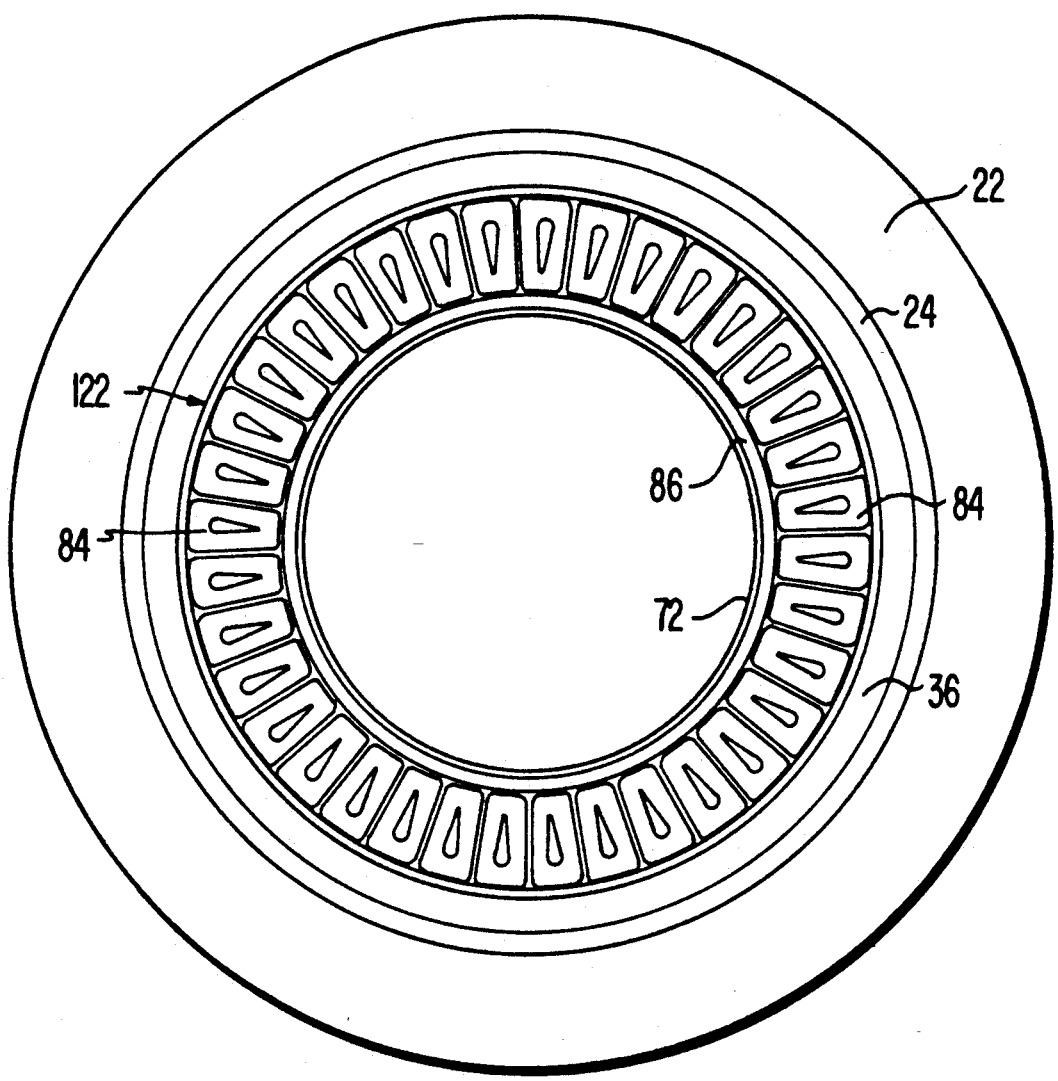
FIG. 6 is a diagrammatic view of the rotor assembly.

FIG. 6 shows an example of the rotor assembly including a salient pole construction of the rotor, the blade hub, and blades. A large number of salient pole windings 84 is mounted in the disk-shaped rotor with frame 122. Rotor excitation windings (secondary), shown generally at 86, are mounted in a slot in the interior circumference of rotor 30, and the journal bearing surface is shown at 72. Blade hub 24 is mounted on rotor 30 as previously discussed. Thrust bearing surface 36 may either be a surface on hub 24 or rotor 30. Blades 22 (individual blades not shown) are fixed on the outer circumference of blade hub 24, as best shown in FIG. 2.

Figure 10:
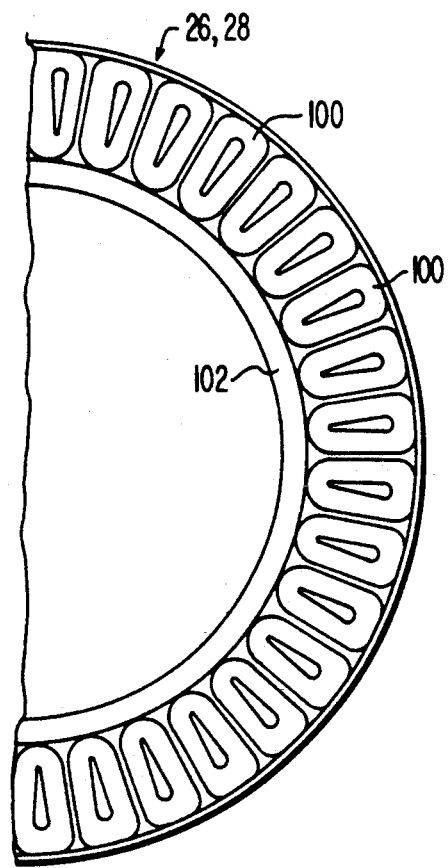
FIG. 10 is a partial diagrammatic view of a stator showing the position of salient pole windings.
Figure 11:
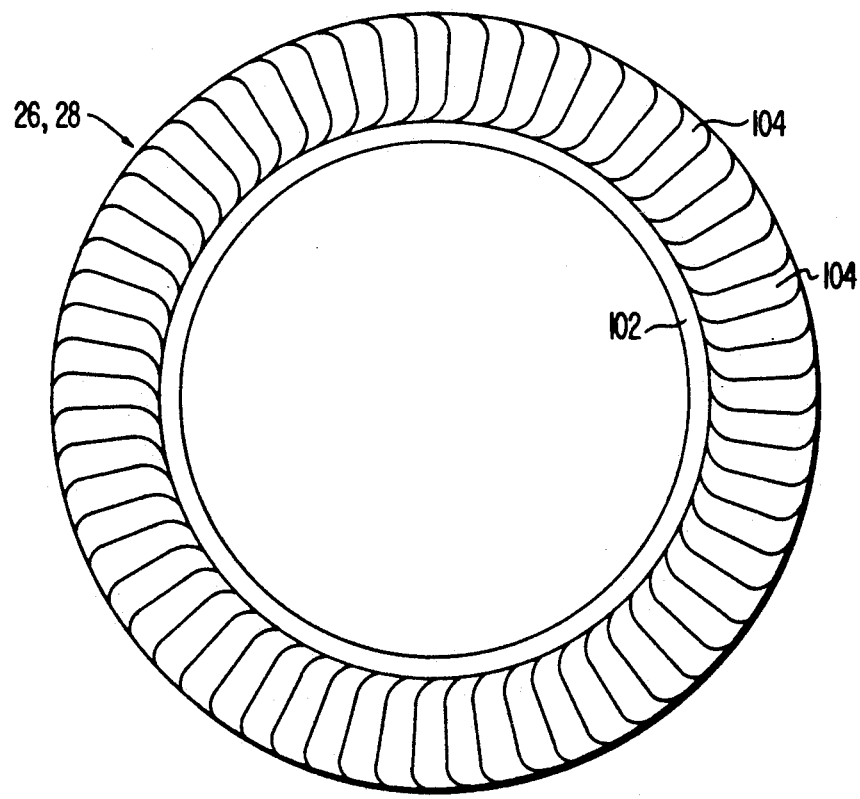
FIG. 11 is a diagrammatic view of a stator with the windings in a lap wound configuration.

FIG. 7 is an illustration of rotor frame 122 showing a plurality of mounting slots 88 for the rotor salient pole windings. Rotor excitation winding (secondary) slots are shown at 90. As shown in FIG. 8, first slots 92 and second slots 94 are provided for dual salient pole rotor windings where the motor would be mounted in a vessel with backup, redundant systems. FIG. 8 further illustrates the rotor excitation winding slots 90 and a wiring channel 96. Rectifiers may also be mounted in wiring channel 96. FIG. 9 is an illustration of a typical salient pole winding 84 mounted via mounting bolts 98 in slots 88. FIG. 10 is a partial view of the stator 26 or 28 with a plurality of salient pole stator windings 100 mounted inside, and primary excitation windings shown generally at 102. FIG. 11 is an alternate embodiment of stators 26 or 28 with the stator windings 104 in a lap wound configuration.

Figure 12:
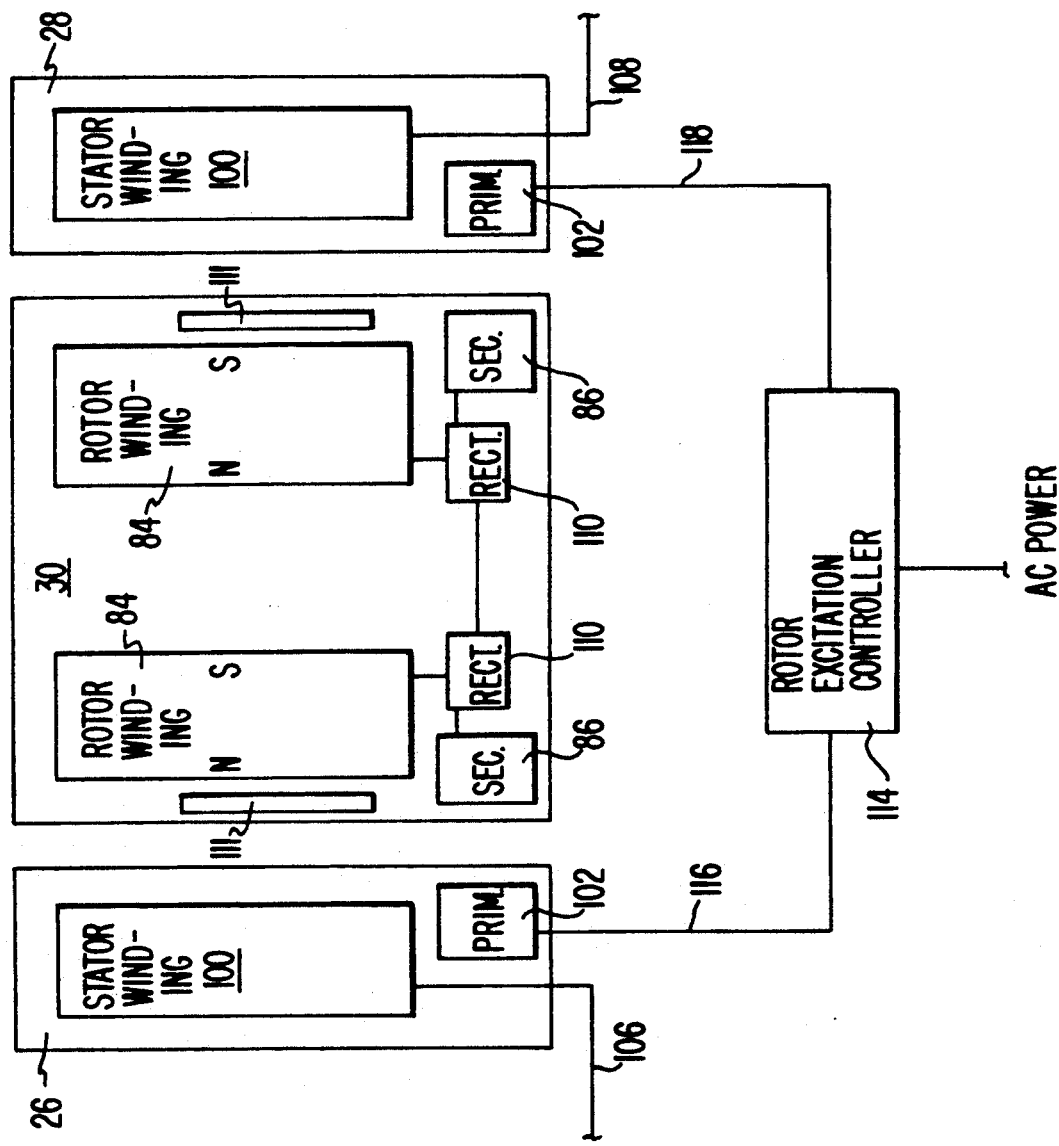
FIG. 12 is a block diagram representation of the apparatus for providing rotor excitation current.

FIG. 12 is a representative view of the apparatus for providing rotor excitation current. A rotor excitation controller 114 supplies an alternating current source to primary excitation windings 102 through cables 116 and 118 respectively. Controller 114 permits the rotor excitation to be variable. Secondary excitation windings 86 in rotor 30 are inductively coupled to primary windings 102 to provide rotor excitation current. This ac current is rectified by dc rectifier circuits 110 to provide a dc current to rotor windings 84, thus creating magnetic poles as shown. Rectifier circuits 110 are connected to provide, with duplicate rotor windings 84, a redundant circuit. As an alternative to the induction circuit shown in FIG. 12, permanent magnets (111) may be installed in rotor 30. As a further alternative, low reluctance magnetic material may be mounted in the rotor, or the induction circuit shown in FIG. 12, permanent magnets, and low reluctance magnetic material may be combined in the rotor/stator assembly to provide the rotor magnetic field.

Figure 13:
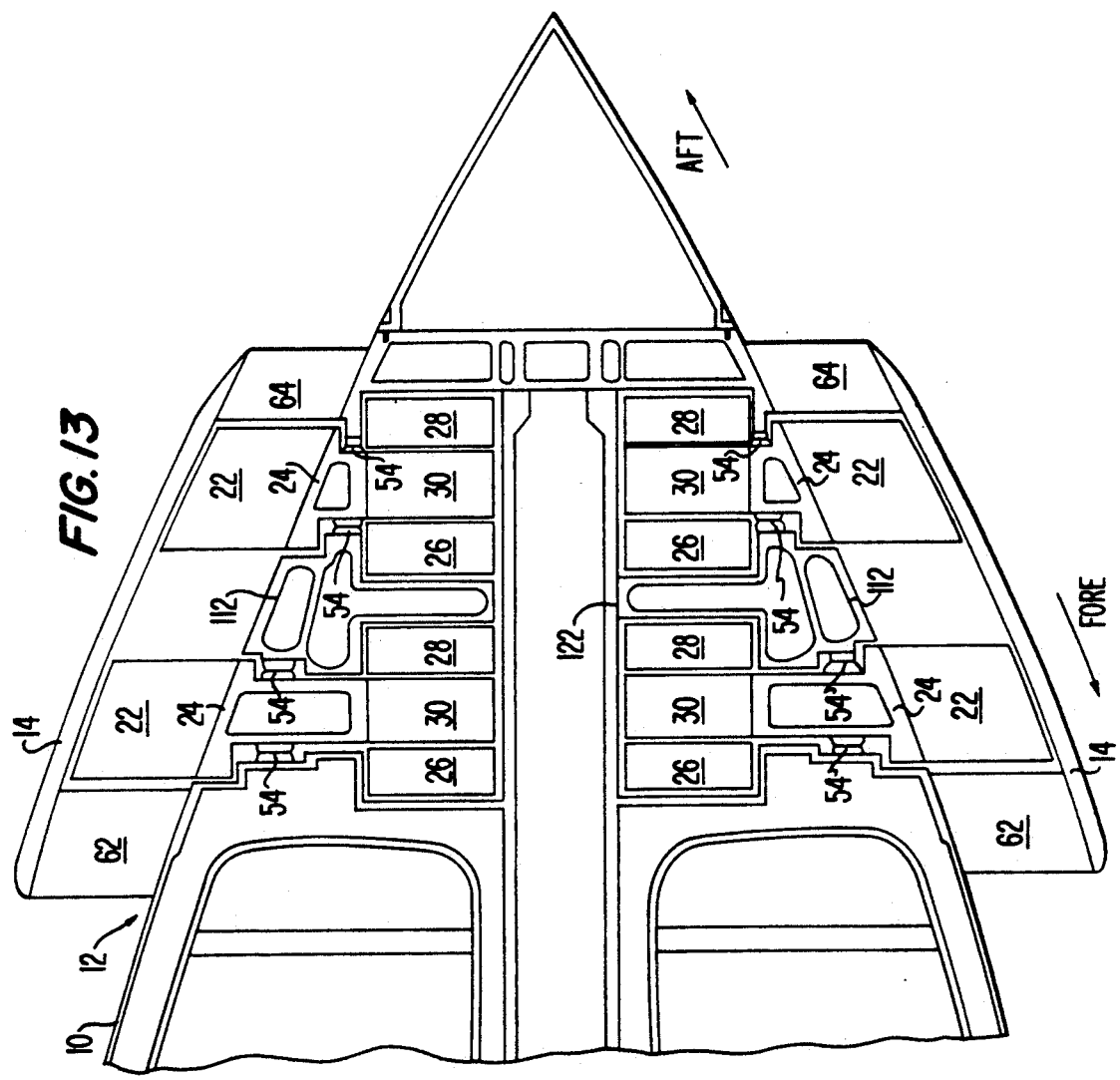
FIG. 13 is a representation illustrating the dual, counter-rotating propulsor embodiment.

FIG. 13 is a representation illustrating the dual, counter-rotating propulsor embodiment of the present invention. In this embodiment, two rotors 30 (one with reverse blades 22 mounted on hub 24) are journalled in the vessel body 10 on either side of a thrust transference member 112. Stators 26,28 (four total) are mounted in section 12 of vessel body 10 on either side of each rotor 30, and are powered in a conventional manner such that rotors 30 rotate in opposite directions. Thrust bearing assemblies 54 are mounted on either side of thrust transference member 112 and on fore and aft sections of the vessel body 10. In the embodiment illustrated in FIG. 13, during forward movement, propulsive forces produced by the forward rotor assembly (rotor 30, hub 24, and blades 22) are transferred directly to the vessel structure through forward thrust bearing assemblies 54. Propulsive forces of the rearward rotor assembly are transferred through the thrust transference member 112, to the thrust bearing assemblies 54 mounted on the thrust transference member 112, to the forward thrust bearing assemblies 54, and finally to the vessel structure. Similarly during rearward movement, the propulsive forces produced by the rearward rotor assembly are transferred directly to the vessel structure while propulsive forces produced by the forward rotor assembly are transferred through thrust transference member 112 and the intermediate thrust bearing assemblies. As an alternative, and shown only in the lower half of FIG. 13, the thrust transference member may be secured to the vessel structure as shown generally at 122 or be a portion of the vessel structure. In this alternative embodiment, propulsive forces of both rotor assemblies are transferred directly to the vessel structure through the thrust bearing assemblies.

The present invention has been described and shown in relation to various preferred embodiments. Detailed descriptions and illustrations of certain known components and operations have been omitted for the sake of clarity and understanding of the present invention. Conventional components and principles will be readily appreciated by those having ordinary skill in the art as will various modifications and changes that can be made to the embodiments disclosed, such embodiments, modifications, and changes being intended to fall within the scope of the invention a defined by the following claims.

I claim:

1. A system for propelling a body through a fluid comprising:
    a body section having a generally cylindrical configuration;
    a propulsor mounted within said body section;
    said propulsor including a shaft-free motor with a disk-shaped rotor and a disk-shaped stator, said rotor and stator being axially aligned with a longitudinal axis of said body section;
    a rotor assembly including said rotor;
    said propulsor including propulsor blades attached to an outer circumferential surface of said rotor assembly and extending beyond the periphery of said body;
    said body section including an inner, substantially cylindrical housing having an outer circumferential surface;
    a journal bearing mounted on said housing outer circumferential surface; and wherein
    said rotor is journalled on said inner housing.

2. A system as in claim 1 wherein
    said body section further includes a front housing portion;
    a plurality of spaced thrust bearing assemblies mounted on a peripheral area of said front housing portion around the circumference of said front housing portion; and
    said rotor assembly includes a peripheral bearing surface for engagement with said plurality of thrust bearing assemblies.

3. A system as in claim 2 further comprising:
    a fluid supply connected to a fluid passage in said body; and
    said fluid passage extending from said body into said body section and radially through said rotor to cool said rotor and to supply cooling and lubricating fluid to a peripheral section of said rotor.

4. A system as in claim 3 wherein
    said journal bearing comprises a plurality of spaced bearing plates attached to said housing outer circumference surface.

5. A system as in claim 4 wherein said fluid passage extending into said body section further comprises
    a plurality of secondary fluid passages extending through said housing and having outlets formed on said housing outer circumferential surface between said spaced bearing plates, whereby said journal bearing is lubricated and cooled by fluid supplied through said fluid passage.

6. A system as in claim 5 wherein
    said rotor includes an inner circumferential bearing surface, and a plurality of tertiary fluid passages extending radially through said rotor, said tertiary passages having fluid inlets in said rotor inner bearing surface and fluid outlets in an outer peripheral section of said rotor.

7. A system as in claim 6 wherein
    said rotor fluid outlets supply fluid to lubricate and cool said thrust bearing assemblies through the centrifugal force caused by rotation of said rotor drawing fluid outwardly through said tertiary fluid passages.

8. A system as in claim 2 further including a fluid passage extending radially through said stator to cool said stator.

9. A system as in claim 1 including at least two disk-shaped stators with said rotor and stators being axially aligned with a longitudinal axis of said body section;
    said stators being mounted to said body on either side of said rotor;
    said rotor being journal mounted in said body section;
    an electrical source for providing power to said stators; and
    means for varying the allocation of power provided between said at least two stators to electrically alter magnetic forces on said rotor, whereby propulsive thrust forces can be absorbed and propulsor induced structural vibration can be reduced.

10. A system as in claim 4 wherein
    said electrical source includes a variable frequency controller coupled to said stators, whereby the frequency of power supplied to said stators can be increased gradually from zero cycles/second.

11. A system as in claim 10 wherein said variable frequency controller is a cycloconverter.

12. A system as in claim 9 further including permanent magnets mounted in said rotor.

13. A system as in claim 12 further including low reluctance magnetic material mounted in said rotor.

14. A system as in claim 1 further including,
    means for inductively supplying excitation current to said rotor, said excitation means including primary coils in said stator and secondary coils and rectifiers in said rotor.

15. A system as in claim 1 wherein said rotor includes permanent magnets for producing a rotor magnetic field.

16. A system as in claim 1 including, at least two disk-shaped stators, said rotor and stators being axially aligned with a longitudinal axis of said first body section, and wherein said stators are mounted to said body on either side of said rotor;

a power source for supplying alternating current to said stators; and sound attenuating material interposed between said stators and said body to dampen alternating current vibrations of said body resulting from alternating current flowing through said stators.

17. A system as in claim 1 including, at least two rotor assemblies including two disk-shaped rotors and at least four disk-shaped stators, said rotors and stators being axially aligned with a longitudinal axis of said body section and said propulsor blades being attached to an outer circumferential surface of each of said rotor assemblies, and wherein said stators are mounted to said body with one stator arranged on either side of each of said rotors;

means for applying alternating current to each of said stators such that said rotors rotate in opposite directions when current is supplied to said stators; and thrust transference means interposed between said two rotor assemblies to transfer thrust from one rotor assembly to the other rotor assembly and to said body.

18. A system as in claim 1 further comprising a shroud attached to said body and extending around said propulsor blades.

19. A system as in claim 1 wherein said fluid is water and said rotor and stator operate in water and under submergence water pressure.

20. A system as in claim 1 wherein said rotor assembly includes a hub assembly;

said propulsor blades are mounted on said hub assembly which is removably attached to said rotor;

said rotor is removably journal mounted to said body section; and said stator is removably mounted to said body, whereby said propelling system can be mounted in stages within said body.

21. A system as in claim 1 wherein said rotor and stator are substantially iron free.

22. A system for propelling a body through a fluid comprising:

a body section having a generally cylindrical configuration;

a propulsor mounted within said body section;

said propulsor including a shaft-free motor with a disk-shaped rotor and a disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body;

said body section further including a front housing portion;

a plurality of spaced thrust bearing assemblies mounted on a peripheral area of said front housing portion around the circumference of said front housing portion; and said rotor assembly including a peripheral bearing surface for engagement with said plurality of thrust bearing assemblies.

23. A system as in claim 22 further including a rear housing portion;

a thrust bearing assembly mounted on a peripheral area of said rear housing portion around the circumference of said rear housing portion; and said rotor assembly including front and rear peripheral bearing surfaces for engagement with said thrust bearing assemblies.

24. A system as in claim 22 wherein said thrust bearing assembly comprises a plurality of spaced thrust bearing subassemblies arranged around the circumference of said housing portion.

25. A system as in claim 22 wherein said thrust bearing assembly is a single annular thrust bearing assembly.

26. A system as in claim 22 further including a fluid supply connected to a fluid passage in said body; and said fluid passage extending from said body into said body section and radially through said rotor to cool said rotor and to supply cooling and lubricating fluid to a peripheral section of said rotor.

27. A system as in claim 22 including at least two disk-shaped stators, said rotor and stators being axially aligned with a longitudinal axis of said body section, wherein said stators are mounted to said body on either side of said rotor;

said rotor being journal mounted in said body section;

an electrical source for providing power to said stators; and means for varying the allocation of power provided between said two stators to electrically alter magnetic forces on said rotor, whereby propulsive thrust forces can be absorbed and propulsor induced structural vibration can be reduced.

28. A system as in claim 27 wherein said electrical source includes a variable frequency controller coupled to said stators, whereby the frequency of power supplied to said stators can be increased gradually from zero cycles/second.

29. A system as in claim 22 further including, means for inductively supplying excitation current to said rotor, said excitation means including primary coils in said stator and secondary coils and rectifiers in said rotor.

30. A system as in claim 22 wherein said body section includes an inner, substantially cylindrical housing having an outer circumferential surface;

a journal bearing mounted on said housing outer circumferential surface;

said rotor being journalled on said inner housing;

a fluid supply connected to a fluid passage in said body;

said fluid passage extending from said body into said inner housing and to said journal bearing to lubricate and cool said journal bearing.

31. A system as in claim 30 wherein said journal bearing comprises a plurality of spaced bearing plates attached to said housing outer circumferential surface.

32. A system as in claim 31 wherein said fluid passage extending into said housing further comprises a plurality of secondary fluid passages extending through said housing and having outlets formed on said housing outer circumferential surface between said spaced bearing plates, whereby said journal bearing is lubricated and cooled by fluid supplied through said fluid passage.

33. A system as in claim 32 wherein said rotor includes an inner circumferential bearing surface, and a plurality of tertiary fluid passages extending radially through said rotor, said tertiary passages having fluid inlets in said inner bearing surface and fluid outlets in an outer peripheral section of said rotor.

34. A system as in claim 33 wherein
said rotor fluid outlets supply fluid to lubricate and cool said thrust bearing assemblies through the centrifugal force caused by rotation of said rotor drawing fluid outwardly through said tertiary fluid passages.

35. A system as in claim 22 including two stators and, wherein
said stators are mounted to said body on either side of said rotor;
a power source for supplying alternating current to said stators; and
sound attenuating material interposed between said stators and said body to dampen alternating current vibrations of said body resulting from alternating current flowing through said stators.

36. A system as in claim 22 including,
at least two rotor assemblies including two disk-shaped rotors and at least four disk-shaped stators, said rotors and stators being axially aligned with a longitudinal axis of said body section;
said propulsor blades attached to an outer circumferential surface of each of said rotor assemblies; and wherein
said stators are mounted to said body with one stator arranged on either side of each of said rotors;
means for applying alternating current to each of said stators such that said rotors rotate in opposite directions when current is supplied to said stators; and
thrust transference means interposed between said two rotor assemblies to transfer thrust from one rotor assembly to the other rotor assembly and to said body.

37. A system as in claim 22 further including a shroud extending around said propulsor blades.

38. A system as in claim 22 wherein said fluid is water and said rotor and stator operate in water and under submergence water pressure.

39. A system as in claim 22 wherein,
said rotor assembly includes a hub assembly;
said propulsor blades are mounted on said hub assembly which is removably attached to said rotor;
said rotor is removably journal mounted to said body section; and
said stator is removably mounted to said body, whereby said propelling system can be mounted in stages within said body.

40. A system as in claim 22 wherein said rotor and stator are substantially iron free.

41. A system for propelling a body through a fluid comprising:
a body section having a generally cylindrical configuration;
a propulsor mounted within said body section;
said propulsor including a shaft-free motor with a disk-shaped rotor and a disk-shaped stator, said rotor and stator being axially aligned with a longitudinal axis of said body section;
a rotor assembly including said rotor;
said propulsor including propulsor blades attached to an outer circumferential surface of said rotor assembly and extending beyond the periphery of said body;
a fluid supply connected to a fluid passage in said body; and
said fluid passage extending from said body into said body section and radially through said rotor to cool said rotor and to supply fluid for cooling and lubricating to a peripheral section of said rotor.

42. A system as in claim 41 wherein said fluid passage extends radially through said stator to cool said stator.

43. A system as in claim 41 including two disk-shaped stators and wherein,
said stators are mounted to said body on either side of said rotor;
said rotor being journal mounted in said body section;
an electrical source for providing power to said stators; and
means for varying the allocation of power provided between said two stators to electrically alter magnetic forces on said rotor, whereby propulsive thrust forces can be absorbed and propulsor induced structural vibration can be reduced.

44. A system as in claim 43 wherein,
said electrical source includes a variable frequency controller coupled to said stators, whereby the frequency of power supplied to said stators can be increased gradually from zero cycles/second.

45. A system as in claim 41 further including,
means for inductively supplying excitation current to said rotor, said excitation means including primary coils in said stator and secondary coils and rectifiers in said rotor.

46. A system as in claim 41 wherein,
said body section includes an inner, substantially cylindrical housing having an outer circumferential surface;
a journal bearing mounted on said housing outer circumferential surface;
said rotor being journalled on said inner housing; and
said fluid passage extending from said body into said inner housing and to said journal bearing to lubricate and cool said journal bearing.

47. A system as in claim 46 wherein,
said journal bearing comprises a plurality of spaced bearing plates attached to said housing outer circumferential surface.

48. A system as in claim 47 wherein,
said fluid passage extending into said housing further comprises a plurality of secondary fluid passages extending through said housing and having outlets formed on said housing outer circumferential surface between said spaced bearing plates, whereby said journal bearing is lubricated and cooled by fluid supplied through said fluid passage.

49. A system as in claim 48 wherein,
said rotor includes an inner circumferential bearing surface, and a plurality of tertiary fluid passages extending radially through said rotor, said tertiary passages having fluid inlets in said inner bearing surface and fluid outlets in an outer peripheral section of said rotor.

50. A system as in claim 49 wherein,
said body section further includes a front housing portion, a plurality of spaced thrust bearing assemblies mounted on an outer peripheral area of said front housing portion around the circumference of said front housing portion; and wherein said rotor fluid outlets supply fluid to lubricate and cool said thrust bearing assemblies through the centrifugal force caused by rotation of said rotor drawing fluid outwardly through said tertiary fluid passages.

51. A system as in claim 41 including two stators and, wherein said stators are mounted to said body on either side of said rotor;

a power source for supplying alternating current to said stators; and sound attenuating material interposed between said stators and said body to dampen alternating current vibrations of said body resulting from alternating current flowing through said stators.

52. A system as in claim 41 including, at least two rotor assemblies including two disk-shaped rotors, and at least four disk-shaped stators, said rotors and stators being axially aligned with a longitudinal axis of said first body section;

said propulsor blades attached to an outer circumferential surface of each of said rotor assemblies; and wherein said stators are mounted to said body with one stator arranged on either side of each of said rotors;

means for applying alternating current to each of said stators such that said rotors rotate in opposite directions when current is supplied to said stators; and thrust transference means interposed between said two rotor assemblies to transfer thrust from one rotor assembly to the other rotor assembly and to said body.

53. A system as in claim 41 further including a shroud extending around said propulsor blades.

54. A system as in claim 41 wherein said fluid is water and said rotor and stator operate in water and under submergence water pressure.

55. A system as in claim 41 wherein, said rotor assembly includes a hub assembly;

said propulsor blades are mounted on said hub assembly which is removably attached to said rotor:

said rotor is removably journal mounted to said body section; and said stator is removably mounted to said body, whereby said propelling system can be mounted in stages within said body.

56. A system as in claim 55 including, a shroud extending around said propulsor blades.

57. A system as in claim 56 wherein said shroud has a fluid inlet for channeling fluid to said body section for cooling and lubricating said propulsor.

58. A system as in claim 56 further including struts located before and after said propulsor blades to increase maneuverability.

59. A system as in claim 56 wherein said rotor, stator, and shroud are split to facilitate assembly within said body.

60. A system as in claim 41 wherein said rotor and stator are substantially iron free.

61. A system for propelling a body through a fluid comprising:

a body section having a generally cylindrical configuration;

a propulsor mounted within said body section;

said propulsor including a shaft-free motor with at least one disk-shaped rotor and at least two disk-shaped stators, said rotor and stators being axially aligned with a longitudinal axis of said body section;

a rotor assembly including said rotor;

said propulsor including propulsor blades attached to an outer circumferential surface of said rotor assembly and extending beyond the periphery of said body; and wherein said stators are mounted to said body on either side of said rotor;

said rotor being journal mounted in said body section;

an electrical source for providing power to said stators; and means for varying the allocation of power provided between said at least two stators to provide a first magnitude of power to a first stator and a different second magnitude of power to a second stator to electrically alter magnetic forces on said rotor, whereby propulsive thrust forces can be absorbed and propulsor induced structural vibration can be reduced.

62. A system as in claim 61 wherein said electrical source includes a variable frequency controller coupled to said stators, whereby the frequency of power supplied to said stators can be increased gradually from zero cycles/second.

63. A system as in claim 62 wherein said controller is a cycloconverter.

64. A system as in claim 61 further including, means for inductively supplying excitation current to said rotor, said supply means including primary coils in said stator and secondary coils and rectifiers in said rotor.

65. A system as in claim 61 wherein, said body section includes an inner, substantially cylindrical housing having an outer circumferential surface;

a journal bearing mounted on said housing outer circumferential surface;

said rotor being journalled on said inner housing;

a fluid supply connected to a fluid passage in said body;

said fluid passage extending from said body into said inner housing and to said journal bearing to lubricate and cool said journal bearing.

66. A system as in claim 65 wherein, said journal bearing comprises a plurality of spaced bearing plates attached to said housing outer circumferential surface.

67. A system as in claim 66 wherein, said fluid passage extending into said housing further comprises a plurality of secondary fluid passages extending through said housing and having outlets formed on said housing outer circumferential surface between said spaced bearing plates, whereby said journal bearing is lubricated and cooled by fluid supplied through said fluid passage.

68. A system as in claim 67 wherein, said rotor includes an inner circumferential bearing surface, and a plurality of tertiary fluid passages extending radially through said rotor, said tertiary passages having fluid inlets in said inner bearing surface and fluid outlets in an outer peripheral section of said rotor.

69. A system as in claim 68 wherein, said body section further includes a front housing portion, a plurality of spaced thrust bearing assemblies mounted on an outer peripheral area of said front housing portion around the circumference of said front housing portion; and wherein said rotor fluid outlets supply fluid to lubricate and cool said thrust bearing assemblies through the centrifugal force caused by rotation of said rotor drawing fluid outwardly through said tertiary fluid passages.

70. A system as in claim 61 including two stators and, wherein said stators are mounted to said body on either side of said rotor;

a power source for supplying alternating current to said stators; and sound attenuating material interposed between said stators and said body to dampen alternating current vibrations of said body resulting from alternating current flowing through said stators.

71. A system as in claim 61 including, at least two rotor assemblies including two disk-shaped rotors, and at least four disk-shaped stators, said rotors and stators being axially aligned with a longitudinal axis of said body section;

said propulsor blades attached to an outer circumferential surface of each of said rotor assemblies; and wherein said stators are mounted to said body with one stator arranged on either side of each of said rotors;

means for supplying alternating current to each of said stators such that said rotors rotate in opposite directions when current is supplied to said stators; and thrust transference means interposed between said two rotor assemblies to transfer thrust from one rotor assembly to the other rotor assembly and to said body.

72. A system as in claim 61 further including a shroud extending around said propulsor blades.

73. A system as in claim 61 wherein said fluid is water and said rotor and stator operate in water and under submergence water pressure.

74. A system as in claim 61 wherein, said rotor assembly further includes a hub assembly, and said propulsor blades are mounted on said hub assembly that is removably attached to said rotor;

said rotor is removably journal mounted to said body section; and said stator is removably mounted to said body, whereby said propelling system can be mounted in stages within said body.

75. A system as in claim 74 further including a shroud extending around said propulsor blades.

76. A system as in claim 75 wherein said rotor, stator and shroud are split to facilitate assembly in said body.

77. A system as in claim 61 wherein said rotor and stator are substantially iron free.

78. A system for propelling a body through a fluid comprising:

a body section having a generally cylindrical configuration;

a propulsor mounted within said body section;

said propulsor including a shaft-free motor with a disk-shaped rotor and a disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body;

means for inductively supplying excitation current to said rotor, said excitation means including primary coils in said stator and secondary coils and rectifiers in said rotor.

79. A system as in claim 78 including two stators and, wherein said stators are mounted to said body on either side of said rotor;

a power source for supplying alternating current to said stators; and sound attenuating material interposed between said stators and said body to dampen alternating current vibrations of said body resulting from alternating current flowing through said stators.

80. A system as in claim 78 including, at least two rotor assemblies including two disk-shaped rotors, and at least four disk-shaped stators, said rotors and stators being axially aligned with a longitudinal axis of said first body section;

said propulsor blades attached to an outer circumferential surface of each of said rotor assemblies; and wherein said stators are mounted to said body with one stator arranged on either side of each of said rotors;

means for supplying alternating current to each of said stators such that said rotors rotate in opposite directions when current is supplied to said stators; and thrust transference means interposed between said two rotor assemblies to transfer thrust from one rotor assembly to the other rotor assembly and to said body.

81. A system as in claim 78 further including a shroud extending around said propulsor blades.

82. A system as in claim 78 wherein said fluid is water and said rotor and stator operate in water and under submergence water pressure.

83. A system as in claim 78 wherein, said rotor assembly includes a hub assembly;

said propulsor blades are mounted on said hub assembly which is removably attached to said rotor;

said rotor is removably journal mounted to said body section; and said stator is removably mounted to said body, whereby said propelling system can be mounted in stages within said body.

84. A system as in claim 83 further including a shroud extending around said propulsor blades.

85. A system as in claim 84 wherein said rotor, stator, and shroud are split to facilitate assembly in said body.

86. A system as in claim 78 wherein said rotor and stator are substantially iron free.

87. A system as in claim 78 further including a rotor excitation controller for varying rotor excitation.

88. A system for propelling a body through a fluid comprising:

a body section having a generally cylindrical configuration;

a propulsor mounted within said body section;

said propulsor including a shaft-free motor with a disk-shaped rotor and a disk-shaped stator, said rotor and stator being axially aligned with a longitudinal axis of said body section;
a rotor assembly including said rotor;
said propulsor including propulsor blades attached to an outer circumferential surface of said rotor assembly and extending beyond the periphery of said body;
said body section including an inner, substantially cylindrical housing having an outer circumferential surface;
a journal bearing mounted on said housing outer circumferential surface;
said rotor being journalled on said inner housing;
a fluid supply connected to a fluid passage in said body;
said fluid passage extending from said body into said inner housing and to said journal bearing to lubricate and cool said journal bearing.

89. A system as in claim 88 wherein said fluid passage extends radially through said stator to cool said stator.

90. A system as in claim 88 wherein
said journal bearing comprises a plurality of spaced bearing plates attached to said housing outer circumferential surface.

91. A system as in claim 90 wherein said fluid passage extending into said housing further comprises a plurality of secondary fluid passages extending through said housing and having outlets formed on said housing outer circumferential surface between said spaced bearing plates, whereby said journal bearing is lubricated and cooled by fluid supplied through said fluid passage.

92. A system as in claim 91 wherein said rotor includes an inner circumferential bearing surface, and a plurality of tertiary fluid passages extending radially through said rotor, said tertiary passages having fluid inlets in said inner bearing surface and fluid outlets in an outer peripheral section of said rotor.

93. A system as in claim 92 wherein said body section further includes a front housing portion;
a plurality of spaced thrust bearing assemblies mounted on an outer peripheral area of said front housing portion around the circumference of said front housing portion; and wherein
said rotor fluid outlets supply fluid to lubricate and cool said thrust bearing assemblies through the centrifugal force caused by rotation of said rotor drawing fluid outwardly through said tertiary fluid passages.

94. A system as in claim 88 including two stators and, wherein
said stators are mounted to said body on either side of said rotor;
a power source for supplying alternating current to said stators; and
sound attenuating material interposed between said stators and said body to dampen alternating current vibrations of said body resulting from alternating current flowing through said stators.

95. A system as in claim 88 including,
at least two rotor assemblies including disk-shaped rotors and at least four disk-shaped stators, said rotors and stators being axially aligned with a longitudinal axis of said body section;
said propulsor blades attached to an outer circumferential surface of each of said rotor assemblies; and wherein
said stators are mounted to said body with one stator arranged on either side of each of said rotors;
means for supplying alternating current to each of said stators such that said rotors rotate in opposite directions when current is supplied to said stators; and
thrust transference means interposed between said two rotor assemblies to transfer thrust from one rotor assembly to the other rotor assembly and to said body.

96. A system as in claim 88 further including a shroud extending around said propulsor blades.

97. A system as in claim 88 wherein said fluid is water and said rotor and stator operate in water and under submergence water pressure.

98. A system as in claim 88 wherein,
said rotor assembly includes a hub assembly;
said propulsor blades are mounted on said hub assembly which is removably attached to said rotor;
said rotor is removably journal mounted to said body section; and
said stator is removably mounted to said body, whereby said propelling system can be mounted in stages within said body.

99. A system as in claim 98 further including a shroud extending around said propulsor blades.

100. A system as in claim 99 wherein said rotor, stator, and shroud are split to facilitate assembly in said body.

101. A system for propelling a body through a fluid comprising:
a body section having a generally cylindrical configuration;
a propulsor mounted within said body section;
said propulsor including a shaft-free motor with a disk-shaped rotor and at least two disk-shaped stators, said rotor and stators being axially aligned with a longitudinal axis of said first body section;
a rotor assembly including said rotor;
said propulsor including propulsor blades attached to an outer circumferential surface of said rotor assembly and extending beyond the periphery of said body; and wherein
said stators are mounted to said body on either side of said rotor;
a power source for supplying alternating current to said stators; and
sound attenuating material interposed between said stators and said body to dampen alternating current vibrations of said body resulting from alternating current flowing through said stators.

102. A system as in claim 101 including,
at least two rotor assemblies including disk-shaped rotors and at least four disk-shaped stators, said rotors and stators being axially aligned with a longitudinal axis of said body section;
said propulsor blades attached to an outer circumferential surface of each of said rotor assemblies; and wherein
said stators are mounted to said body with one stator arranged on either side of each of said rotors;
means for applying alternating current to each of said stators such that said rotors rotate in opposite directions when current is supplied to said stators; and
thrust transference means interposed between said two rotor assemblies to transfer thrust from one rotor assembly to the other rotor assembly and to said body.

103. A system as in claim 101 further including a shroud extending around said propulsor blades.

104. A system as in claim 101 wherein said fluid is water and said rotor and stator operate in water and under submergence water pressure.

105. A system as in claim 101 wherein,
said rotor assembly includes a hub assembly;
said propulsor blades are mounted on said hub assembly which is removably attached to said rotor;
said rotor is removably journal mounted to said body section; and
said stator is removably mounted to said body, whereby said propelling system can be mounted in stages within said body.

106. A system as in claim 105 further including a shroud attached to said body and extending around said propulsor blades.

107. A system as in claim 106 wherein said rotor, stator, and shroud are split to facilitate assembly in said body.

108. A system for propelling a body through a fluid comprising:
a body section having a generally cylindrical configuration;
a propulsor mounted within said body section;
said propulsor including a shaft-free motor with at least two disk-shaped rotors and at least four disk-shaped stators, said rotors and stators being axially aligned with a longitudinal axis of said body section;
two rotor assemblies including said rotors;
said propulsor including propulsor blades attached to an outer circumferential surface of each of said rotor assemblies and extending beyond the periphery of said body; and wherein
said stators are mounted to said body with one stator arranged on either side of each of said rotors;
means for supplying alternating current to each of said stators such that said rotors rotate in opposite directions when current is supplied to said stators; and
thrust transference means interposed between said two rotor assemblies to transfer thrust from one rotor assembly to the other rotor assembly and to said body.

109. A system as in claim 108 further including a shroud extending around said propulsor blades.

110. A system as in claim 108 wherein said fluid is water and said rotor and stator operate in water and under submergence water pressure.

111. A system as in claim 108 wherein,
said rotor assemblies include hub assemblies,
said propulsor blades are mounted on said hub assemblies which are removably attached to said rotors;
said rotors being removably journal mounted to said body section; and
said stators being removably mounted to said body, whereby said propelling system can be mounted in stages within said body.

112. A system as in claim 111 further including a shroud extending around said propulsor blades.

113. A system as in claim 112 wherein said rotors, stators, and shroud are split to facilitate assembly in said body.

114. A system as in claim 108 wherein said thrust transference means is fixed to said body and thrust from each rotor assembly is transferred directly to said body through thrust bearing assemblies.

115. A system for propelling a body through a fluid comprising:
a body section having a generally cylindrical configuration;
a propulsor mounted within said body section;
said propulsor including a shaft-free motor with at least one disk-shaped rotor and at least one disk-shaped stator, said rotor and stator being axially aligned with a longitudinal axis of said first body section;
a rotor assembly including said rotor;
said propulsor including propulsor blades attached to an outer circumferential surface of said rotor assembly and extending beyond the periphery of said body; and
a shroud extending around said propulsor blades, wherein said shroud includes a fluid inlet for channeling fluid to said body section for cooling and lubricating said rotor and stator.

116. A system as in claim 115 further including struts located before and after said propulsor blades to increase maneuverability.

117. A system for propelling a body through a fluid comprising:
a body section having a generally cylindrical configuration;
a propulsor mounted within said body section;
said propulsor including a shaft-free motor with a disk-shaped rotor and a disk-shaped stator, said rotor and stator being axially aligned with a longitudinal axis of said first body section;
said propulsor including propulsor blades attached to an outer circumferential surface of said rotor assembly and extending beyond the periphery of said body; and wherein
a rotor assembly including a rotor and a hub assembly;
said propulsor blades re mounted on said hub assembly which is removably attached to said rotor;
said rotor is removably journal mounted to said body section; and
said stator is removably mounted to said body, whereby said propelling system can be mounted in stages within said body.

118. A system as in claim 117 wherein said rotor and stator are split to facilitate assembly in said body.

119. A system as in claim 117 further including a shroud extending around said propulsor blades, and said rotor, stator, and shroud being split to facilitate mounting in said body.

120. A system for propelling a body through a fluid comprising:
a body section having a generally cylindrical configuration;
a propulsor mounted within said body section;
said propulsor including a shaft-free motor with at least one disk-shaped rotor and at least one disk-shaped stator, said rotor and stator being axially aligned with a longitudinal axis of said body section;
a rotor assembly including said rotor;
said propulsor including propulsor blades attached to an outer circumferential surface of said rotor assembly and extending beyond the periphery of said body; wherein
said disk-shaped rotor and stator have a radial dimension that is at least 10% of the nominal diameter of said generally cylindrical body section at the point where said propulsor is mounted within said body section;

said body section further includes front and rear housing portions;

a plurality of spaced thrust bearing assemblies mounted on peripheral areas of said front and rear housing portions around the circumference of said front and rear housing portions; and said rotor assembly including front and rear peripheral bearing surfaces of engagement with said plurality of thrust bearing assemblies.

121. A system for propelling a body through a fluid comprising:

a body section having a generally cylindrical configuration;

a propulsor mounted within said body section;

said propulsor including a shaft-free motor with at least one disk-shaped rotor and at least one disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body; wherein said disk-shaped rotor and stator have a radial dimension that is at least 10% of the nominal diameter of said generally cylindrical body section at the point where said propulsor is mounted within said body section;

said body section further includes front and rear housing portions;

an annular thrust bearing assembly mounted on a peripheral area of each of said front and rear housing portions around the circumference of said front and rear housing portions; and said rotor assembly including front and rear peripheral bearing surfaces for engagement with said annular thrust bearing assemblies.

122. A system for propelling a body through a fluid comprising:

a body section having a generally cylindrical configuration;

a propulsor mounted within said body section;

said propulsor including a shaft-free motor with at least one disk-shaped rotor and at least one disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body; wherein said disk-shaped rotor and stator have a radial dimension that is at least 10% of the nominal diameter of said generally cylindrical body section at the point where said propulsor is mounted within said body section; and means for inductively supplying excitation current to said rotor, said excitation means including primary coils in said stator and secondary coils and rectifiers in said rotor.

123. A system for propelling a body through a fluid comprising:

a body section having a generally cylindrical configuration;

a propulsor mounted within said body section;

said propulsor including a shaft-free motor with at least one disk-shaped rotor and at least one disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body; wherein said disk-shaped rotor and stator have a radial dimension that is at least 10% of the nominal diameter of said generally cylindrical body section at the point where said propulsor is mounted within said body section; and wherein permanent magnets are mounted in said rotor.

124. A system for propelling a body through a fluid comprising:

a body section having a generally cylindrical configuration;

a propulsor mounted within said body section;

said propulsor including a shaft-free motor with at least one disk-shaped rotor and at least one disk-shaped stator, said rotor and stator being axially aligned with a longitudinal axis of said body section;

a rotor assembly including said rotor;

said propulsor including propulsor blades attached to an outer circumferential surface of said rotor assembly and extending beyond the periphery of said body; wherein said disk-shaped rotor and stator have a radial dimension that is at least 10% of the nominal diameter of said generally cylindrical body section at the point where said propulsor is mounted within said body section;

said body section includes an inner, substantially cylindrical housing having an outer circumferential surface;

a journal bearing mounted on said housing outer circumferential surface;

said rotor being journalled on said inner housing;

a fluid supply connected to a fluid passage in said body; and said fluid passage extending from said body into said inner housing and to said journal bearing to lubricate and cool said journal bearing.

125. A system as in claim 124 further including a shroud extending around said propulsor blades.

126. A system as in claim 124 wherein said fluid is water, and said rotor and stator operate in water and under submergence water pressure.

127. A system as in claim 124 wherein, said journal bearing comprises a plurality of spaced bearing plates attached to said housing outer circumferential surface.

128. A system as in claims 1, 22, 61, 101, 108 or 117, wherein said disk-shaped rotor and stator have a radial dimension that is at least 10% of the nominal diameter of said generally cylindrical body section at the point where said propulsor is mounted within said body section.

* * * * *

UNITED STATES PATENT AND TRADEMARK OFFICE
CERTIFICATE OF CORRECTION

PATENT NO. : 5,078,628
DATED : January 7, 1992
INVENTOR(S) : Chester A. Garis, Jr.

It is certified that error appears in the above-identified patent and that said Letters Patent is hereby corrected as shown below:

In Claim 10, line 1, "4" should read -- 9 --.

In Claim 117, line 16, "re" should read -- are --.

In Claim 125, line 1, "124" should read -- 123 --.

In Claim 126, line 1, "124" should read -- 123 --.

Signed and Sealed this

Twentieth Day of July, 1993

Attest:

MICHAEL K. KIRK

Attesting Officer

Acting Commissioner of Patents and Trademarks